United States Patent
Kyllonen et al.

(10) Patent No.: US 10,148,099 B2
(45) Date of Patent: Dec. 4, 2018

(54) SYSTEM AND METHOD FOR MONITORING AND CONTROLLING PARALLEL BATTERIES

(71) Applicant: Carrier Corporation, Farmington, CT (US)

(72) Inventors: Kimmo A. Kyllonen, Shakopee, MN (US); John A. Seliski, Arden Hills, MN (US)

(73) Assignee: Carrier Corporation, Farmington, CT (US)

(*) Notice: Subject to any disclaimer, the term of this patent is extended or adjusted under 35 U.S.C. 154(b) by 63 days.

(21) Appl. No.: 15/191,179

(22) Filed: Jun. 23, 2016

(65) Prior Publication Data

US 2017/0005492 A1   Jan. 5, 2017

Related U.S. Application Data

(60) Provisional application No. 62/187,684, filed on Jul. 1, 2015.

(51) Int. Cl.
*H01M 10/44* (2006.01)
*H01M 10/46* (2006.01)
*H02J 7/00* (2006.01)

(52) U.S. Cl.
CPC .......... *H02J 7/0026* (2013.01); *H02J 7/0021* (2013.01); *H02J 7/0024* (2013.01); *H02J 7/0034* (2013.01); *H02J 7/0077* (2013.01)

(58) Field of Classification Search
CPC ....... H02J 7/0034; H02J 7/0054; H02J 7/0045
USPC .................. 320/107, 116, 134, 136, 138, 165
See application file for complete search history.

(56) References Cited

U.S. PATENT DOCUMENTS

| | | | |
|---|---|---|---|
| 4,812,672 A | 3/1989 | Cowan et al. | |
| 5,683,827 A | 11/1997 | Yu | |
| 6,430,692 B1 | 8/2002 | Kimble et al. | |
| 6,462,926 B1 | 10/2002 | Zaretsky et al. | |
| 6,724,593 B1 | 4/2004 | Smith | |
| 6,731,022 B2 | 5/2004 | Silverman | |

(Continued)

FOREIGN PATENT DOCUMENTS

| | | |
|---|---|---|
| CN | 2877107 Y | 3/2007 |
| CN | 201584798 U | 9/2010 |

(Continued)

OTHER PUBLICATIONS

Extended European Search Report for European Patent Application No. 16177577.0, dated Oct. 24, 2016.

(Continued)

*Primary Examiner* — Edward Tso
(74) *Attorney, Agent, or Firm* — Locke Lord LLP; Scott D. Wofsy; Joshua L. Jones

(57) ABSTRACT

A power supply circuit is provided that includes first and second power sources coupled in parallel, a first circuit path that provides reverse current blocking and reverse polarity protection associated with positive terminals of the respective first and second power sources, a second circuit path that bypasses current blocking of the first circuit path, a third circuit path that provides reverse polarity protection associated with negative terminals of the respective first and second power sources, and a bypass control circuit that controls the second circuit path based on determination of a predetermined condition.

20 Claims, 3 Drawing Sheets

(56) References Cited

U.S. PATENT DOCUMENTS

| | | |
|---|---|---|
| 7,030,591 B2 | 4/2006 | Stellberger |
| 7,075,194 B2 | 7/2006 | Weidenheimer et al. |
| 7,692,404 B2 | 4/2010 | Harris |
| 7,843,169 B1 | 11/2010 | Tsukamoto et al. |
| 7,924,540 B2 | 4/2011 | Tamegai |
| 8,307,222 B2 | 11/2012 | Wang et al. |
| 8,314,589 B2 | 11/2012 | Hur |
| 8,450,973 B2 | 5/2013 | Ho |
| 8,450,976 B2 | 5/2013 | Lipcsei et al. |
| 8,638,066 B2 | 1/2014 | Robertson |
| 8,816,613 B2 | 8/2014 | Lee |
| 2002/0113494 A1 | 8/2002 | Winick et al. |
| 2002/0141124 A1 | 10/2002 | Ito et al. |
| 2003/0038611 A1 | 2/2003 | Morgan |
| 2010/0215994 A1 | 8/2010 | Kim |
| 2011/0089908 A1 | 4/2011 | Sunderlin |
| 2011/0101919 A1 | 5/2011 | Polk et al. |
| 2012/0212192 A1* | 8/2012 | Peto ............ H02M 5/293 323/223 |
| 2012/0217811 A1 | 8/2012 | Mari |
| 2013/0062952 A1 | 3/2013 | Park et al. |
| 2013/0188287 A1 | 7/2013 | Imura |
| 2013/0260181 A1 | 10/2013 | Nishimura et al. |
| 2013/0320926 A1 | 12/2013 | Kerfoot, Jr. et al. |
| 2014/0117941 A1 | 5/2014 | Knaggs et al. |
| 2014/0160715 A1 | 6/2014 | Wacker |
| 2014/0210399 A1 | 7/2014 | Urschel et al. |
| 2014/0210550 A1 | 7/2014 | Mathe et al. |
| 2014/0268455 A1 | 9/2014 | Gofman |
| 2014/0349146 A1 | 11/2014 | Dittman |
| 2017/0005491 A1* | 1/2017 | Kyllonen ............ H02J 7/0021 |

FOREIGN PATENT DOCUMENTS

| | | |
|---|---|---|
| CN | 102163756 A | 8/2011 |
| CN | 202856325 U | 4/2013 |
| CN | 203522242 U | 4/2014 |
| DE | 19603117 A1 | 8/1996 |
| EP | 0626745 A2 | 11/1994 |
| EP | 0854555 A2 | 7/1998 |
| WO | WO-2009128079 A1 | 10/2009 |

OTHER PUBLICATIONS

Exteded European Search Report for European Patent Application No. 16177570.5, dated Dec. 7, 2016.

* cited by examiner

SYSTEM AND METHOD FOR MONITORING AND CONTROLLING PARALLEL BATTERIES

CROSS REFERENCE TO RELATED APPLICATIONS

This application claims priority to U.S. Provisional Patent Application Ser. No. 62/187,684 filed Jul. 1, 2015 which is incorporated herein by reference in its entirety.

BACKGROUND OF THE INVENTION

1. Field of the Invention

The present disclosure relates to electrical circuits, and more particularly to providing power to electrical circuits.

2. Description of Related Art

Electrical devices commonly derive their power by way of a power supply having one or more batteries. Improper installation (e.g., reverse polarity) or malfunction of a lithium battery can result in failure to provide power, damage to the power supply, damage to the electrical device being powered, and/or an explosion or fire.

For example, a power supply that includes power sources connected in parallel, blocking diodes can be provided to prevent current from flowing in an unwanted direction. However, the blocking diodes can cause voltage drops that can reduce a resultant supply voltage and reduce service life of the battery.

Such conventional methods and systems have generally been considered satisfactory for their intended purpose. However, there is still a need in the art for improved methods and device for monitoring and controlling power sources. The present disclosure provides a solution for this need when two or more power sources are connected parallel to provide power to an electrical device.

SUMMARY OF THE INVENTION

These and other features of the systems and methods of the subject disclosure will become more readily apparent to those skilled in the art from the following detailed description of the preferred embodiments taken in conjunction with the drawings.

In accordance with an aspect of the disclosure, a power supply circuit is provided that includes first and second power sources coupled in parallel, a first circuit path that provides reverse current blocking and reverse polarity protection associated with positive terminals of the respective first and second power sources, a second circuit path that bypasses current blocking of the first circuit path, a third circuit path that provides reverse polarity protection associated with negative terminals of the respective first and second power sources, and a bypass control circuit that controls the second circuit path based on determination of a predetermined condition.

In embodiments, the first circuit path can include a first transistor to provide reverse polarity protection for output from the positive terminal of the first power source by a first body diode of the first transistor, and a second transistor to provide reverse polarity protection for output from the positive terminal of the second power source by a second body diode of the second transistor, and the second circuit path can include a first bypass channel of the first transistor, and a second bypass channel of the second transistor. Additionally, the third circuit path can include a third transistor to provide reverse polarity protection by a third body diode of the third transistor for output from the negative terminal of the first power source, and a fourth transistor to provide reverse polarity protection by a fourth body diode of the fourth transistor for output from the negative terminal of the second power source.

In further embodiments, the bypass control circuit can include a first control transistor that can control the first bypass channel, wherein when the first bypass channel is turned on, output from the first power source flows through the first bypass channel instead of through a first body diode, and when the first bypass channel is turned off, output from the first power source undergoes reverse current blocking and reverse polarity protection by the first body diode. The bypass control circuit can further include a second control transistor that can control the second bypass channel, wherein when the second bypass channel is turned on, output from the second power source flows through the second bypass channel instead of through the second body diode, and when the second bypass channel is turned off, output from the second power source undergoes reverse current blocking and reverse polarity protection by the second body diode.

In additional embodiments, the bypass control circuit can further include a controller that transmits control signals to the first and second control transistors to control the first and second bypass channels independently of one another. The controller can control turning off at least one of the first and second bypass channels in response to detection of installation with proper polarity orientation of one of the first and second power sources, so that the output from at least one of the first and second power sources can flow through the first circuit path, but not through the second circuit path.

In embodiments, the controller can monitor terminal voltages of the first and second power sources in response to detection of installation with proper polarity orientation of at least one of the first and second power sources. The controller can control turning on at least one of the first and second bypass channels in response to a determination that a differential voltage between the terminal voltages of the first and second power sources is below a predetermined threshold, so that the output from at least one of the first and second power sources flows through the second circuit path, but not through the first circuit path. The controller can control turning off at least one of one of the first and second bypass channels upon a determination that the differential voltage is above the predetermined threshold. The power supply circuit can further include a Schottky diode connected in parallel to the first transistor to provide reverse current blocking and reverse polarity protection. The first and second transistors can be enhancement-mode P-channel MOSFETs, and the third and fourth transistors can be enhancement-mode N-channel MOSFETs.

In a further aspect of the disclosure, a power supply circuit can be provided that includes a power source, a first circuit path that provides reverse current blocking and reverse polarity protection associated with a positive terminal of the power source, a second circuit path that bypasses current blocking of the first circuit path, a third circuit path that provides reverse polarity protection associated with a negative terminals of the power source, and a bypass control circuit that controls the first and second circuit paths based on determination of a predetermined condition.

In embodiments, the first circuit path can include a first transistor to provide reverse polarity protection for output from the positive terminal of the power source by a first body diode of the first transistor, further comprising first and second transistors to provide polarity protection for output from positive and negative terminals of the power source, wherein the first transistor has a bypass channel, the second circuit path can include a bypass channel of the first transistor, and the third circuit path can include a third transistor to provide reverse polarity protection by a second body diode of the third transistor for output from the negative terminal of the power source.

The bypass control circuit can include a control transistor that controls the bypass channel of the first transistor, so that when the bypass channel is turned on, output from the power source can flow through the bypass channel instead of through the first body diode; and when the bypass channel is turned off, output from the power source undergoes reverse current blocking and reverse polarity protection by the first body diode. In a further aspect of the disclosure, a method of protecting a power supply circuit can be provided that includes providing reveres current blocking and reverse polarity protection associated with positive terminals of respective first and second power sources, bypassing current blocking of the first circuit path in a second circuit path, providing reverse polarity protection associated with negative terminals of the respective first and second power sources, and controlling the second circuit path based on determination of a predetermined condition.

In embodiments, controlling the first and second circuit paths can include controlling a first bypass channel of a first transistor, wherein when the first bypass channel is turned on, output from the first power source flows through the first bypass channel instead of through a first body diode of the first transistor, and when the first bypass channel is turned off, output from the first power source undergoes reverse current blocking and reverse polarity protection by the first body diode, and controlling a second bypass channel of a second transistor, wherein when the second bypass channel is turned on, output from the second power source flows through the second bypass channel instead of through a second body diode of the second transistor, and when the second bypass channel is turned off, output from the second power source undergoes reverse current blocking and reverse polarity protection by the second body diode.

In embodiments, the first and second bypass channels can be controlled independently of one another. The method can further include controlling turning off at least one of the first and second bypass channels in response to detection of installation with proper polarity orientation of one of the first and second power sources, so that the output from at least one of the first and second power sources can flow through the first circuit path, but not through the second circuit path. The method can further include monitoring terminal voltages of the first and second power sources in response to detection of installation with proper polarity orientation of at least one of the first and second power sources.

In further embodiments, the method can further include controlling turning on at least one of the first and second bypass channels in response to a determination that a differential voltage between the terminal voltages of the first and second power sources is below a predetermined threshold, so that the output from at least one of the first and second power sources can flow through the second circuit path, but not through the first circuit path. The method can further include controlling turning off at least one of one of the first and second bypass channels upon a determination that the differential voltage is above the predetermined threshold.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
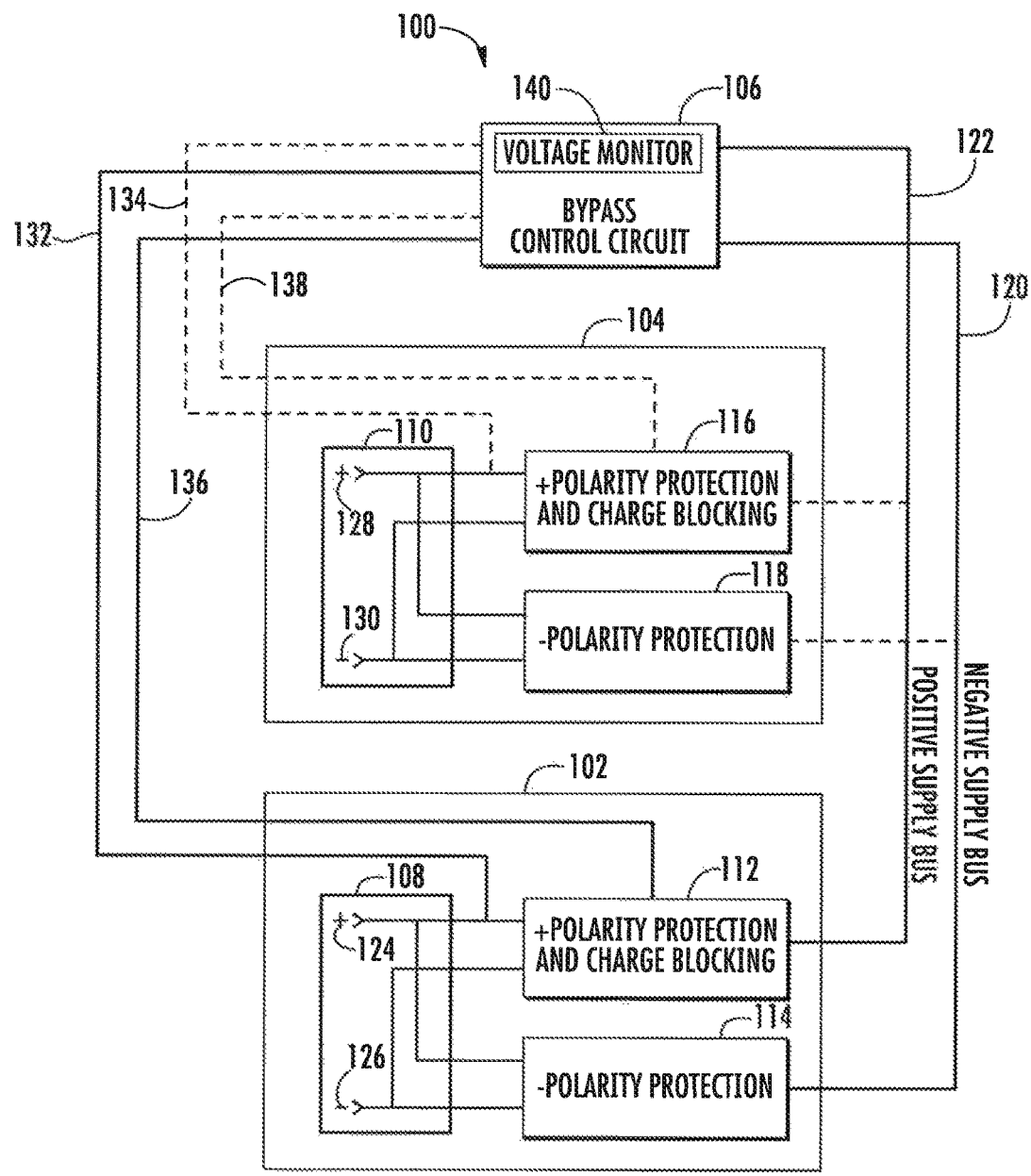
FIG. 1 is a block diagram of an exemplary embodiment of a power supply circuit configured in accordance with the present disclosure, showing a load and control circuit operatively connected to first and second power sources in accordance with the present disclosure.

Reference will now be made to the drawings wherein like reference numerals identify similar structural features or aspects of the subject disclosure. For purposes of explanation and illustration, and not limitation, FIG. 1 shows a power supply circuit 100 that provides a connection in parallel for two or more power sources. The receptacle circuit further includes a blocking circuit to block reverse polarity or misbalanced voltages, and a bypass circuit to bypass the blocking circuit.

FIG. 1 includes a block diagram of a power supply circuit 100 that includes a first protection module 102, a second protection module 104, and a bypass control circuit 106. The first and second protection modules 102 are operatively connected in parallel between ground and a power node. 310 (see FIG. 3). The first protection module 102 includes a first power source 108, and the second protection module 104 includes a second power source 110, with power sources 108 and 110 being coupled in parallel.

The power sources 108, 110 are each a component that supplies DC power to an electric load. The power sources can generate power, convert one type of electrical power to another, or convert a different form of energy, such as solar, mechanical, or chemical, into electrical energy. For example, either of the power sources 108, 110 can be a battery that converts chemical energy into electrical power, such as a lithium battery; a photovoltaic (e.g., solar) cell that converts light into an electric current using the photovoltaic effect, or a switched-mode power supply, which converts AC current to DC voltage.

The power supply circuit 100 is not limited to first and second protection modules 102, 104. In embodiments, the power supply circuit 100 can include additional protection modules that include additional power sources, wherein the power sources 108, 110, and the additional power source(s) are coupled in parallel to one another.

The power supply circuit 100 can include a housing (not shown) in which at least a portion of the circuit (e.g., modules 102, 104, 106, and signal lines 120, 122, 132, 134, 136, 138) can be housed, supported, and/or encased. In an embodiment, the bypass control circuit 106 can be external from the housing.

Reverse polarity protection is provided for voltage output by the power sources 108, 110 in a first circuit path of the power supply circuit 100, which provides reverse polarity protection and current blocking when the power sources 108, 110 are installed improperly, e.g., with reverse polarity, or that the first and second power sources 108, 110 have misbalanced voltages. A bypass control circuit 106 controls a second circuit path of the power supply circuit 100 based on determination of a predetermined condition. The bypass control circuit 106 can be connected between ground and the power node 310. In an embodiment, the bypass control circuit 106 can be powered by receiving power from the power node 310.

The first protection module 102 further includes first and second polarity protection (PP) devices 112, 114 that protect from reverse polarity, wherein the first PP device 112 further blocks charging of power source 108. The second protection module 104 further includes third and fourth PP devices 116, 118 that protect from reverse polarity, wherein the third PP device 116 further blocks charging of power source 108. The PP devices 112, 114, 116, 118 can be connected in series with the respective battery terminals 124, 126, 128, 130.

In an embodiment, the first and third PP devices 112, 116 are enhancement-mode P-Channel MOSFETs that include a body diode that provides reverse polarity protection and current blocking, including isolating the positive bus supply 122 from the negative polarity, and the second and fourth PP device 114, 118 are enhancement-mode N-Channel MOSFETs that include body diodes that provide reverse polarity protection, including isolating the negative bus supply 120 from positive polarity. The isolation of the negative and positive bus supplies 120, 122 can be simultaneous.

The power supply circuit 100 further includes the positive supply bus 122 that is coupled to a positive terminal 124 of the first power source 108, a positive terminal 128 of the second power source 110, and the bypass control circuit 106. In addition, the power supply circuit 100 further includes the negative supply bus 120 that is coupled to a negative terminal 126 of the first power source 108, a negative terminal 130 of the second power source 110, and the bypass control circuit 106.

The bypass control circuit 106 can include or access (e.g., receive voltage measurements from) a voltage monitor 140 that monitors the first and second protection modules 102, 104 via respective monitor lines 132, 134. Additionally, the bypass control circuit 106 can transmit a control signal to the first and second protection modules 102, 104 via respective control lines 136, 138. A control signal can control bypass channels associated with the PP devices 112 and 116. When the control signal turns off the bypass channels associated with the corresponding protection module 102, 104, reverse polarity protection is provided and current blocking is turned on for the corresponding power source 108, 110, and output from the corresponding power source 108, 110 undergoes reverse current blocking and reverse polarity protection by the body diode of the corresponding PP devices 112, 114, 116, 118. When the control signal turns on the bypass channels associated with the corresponding protection modules 102, 104, reverse polarity protection is turned off for the corresponding power source 108, 110, and output from the corresponding power source 108, 110 flows through the bypass channel of the corresponding PP device 112, 116 instead of through the body diodes of the corresponding PP devices 112, 114, 116, and 118.

Figure 2:
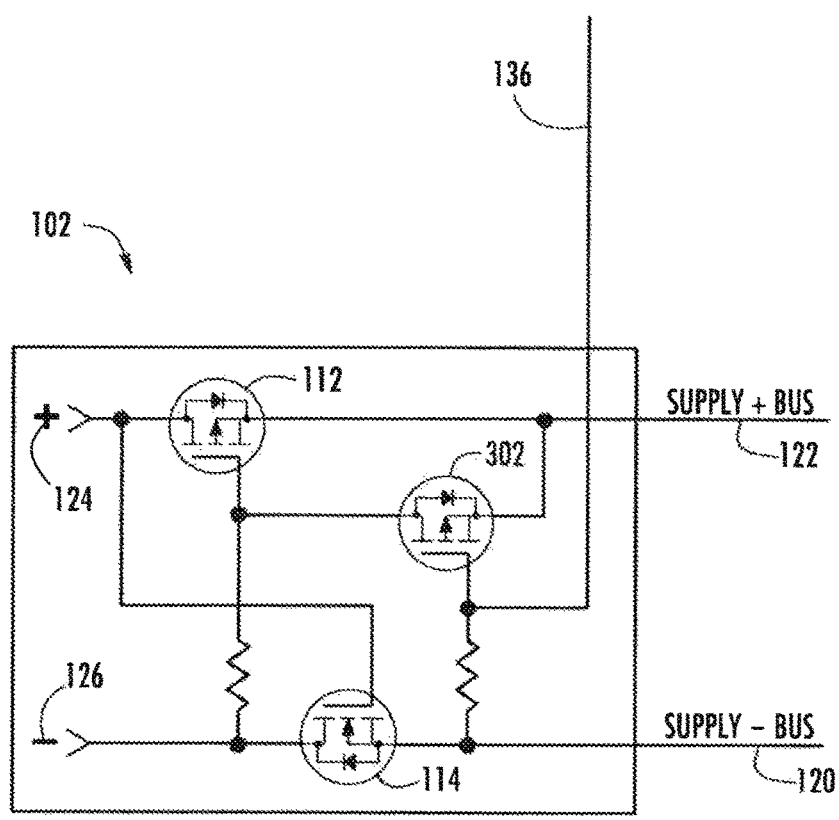
FIG. 2 is a schematic diagram of a protection module of the power supply circuit shown in FIG. 1.
Figure 3:
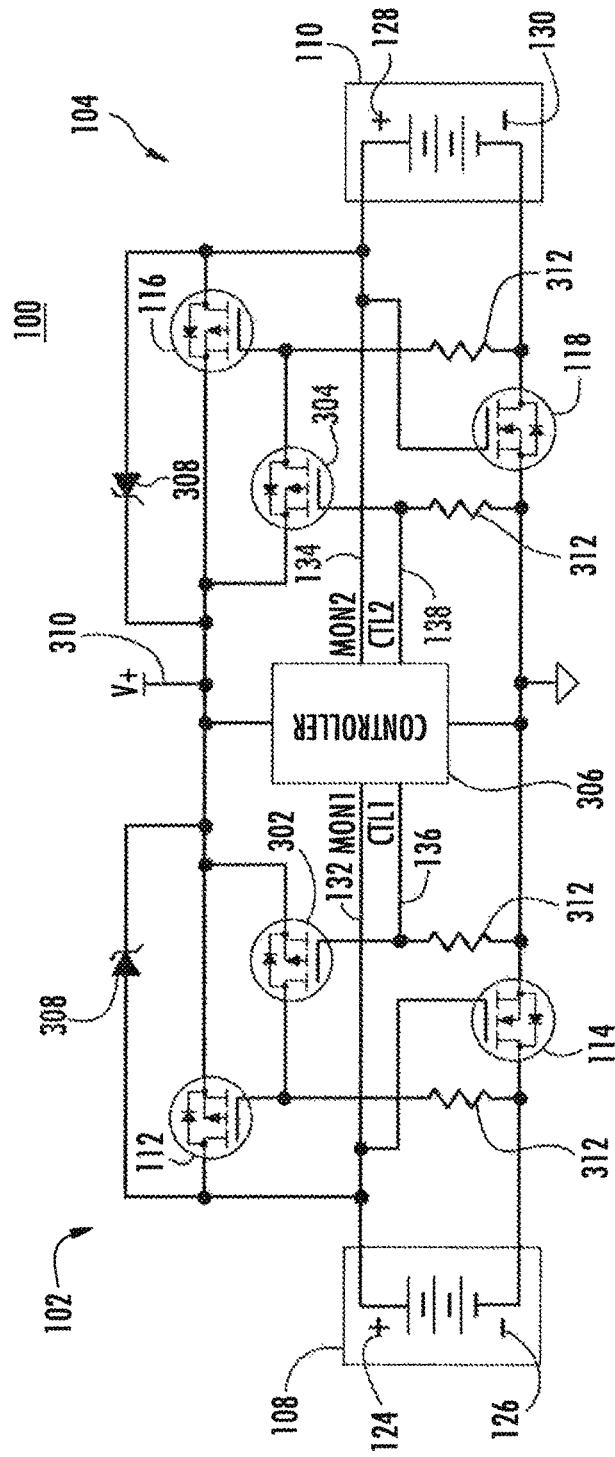
FIG. 3 is a schematic diagram of the power supply circuit shown in FIG. 1, showing the control circuit in greater detail.

With reference to FIGS. 2 and 3, FIG. 2 shows a schematic illustration of the protection module 102 with a control transistor 302 of the bypass control circuit 106. The first and second PP devices 112, 114 are shown as transistors. Output from the positive terminal 124 of the first power source 108 flows through the first PP device 112 to the positive supply bus 122. Output from the negative terminal 126 of the first power source 108 flows through the second PP device 114 to the negative supply bus 120.

The first PP device 112 includes a bypass channel. The bypass channel can be formed in the enhancement-mode P-Channel MOSFET PP devices 112 and/or 116 by positively biasing a source terminal respect to its gate of the PP device 112, 116, which causes a drain-source channel of the PP device 112, 116 to be turned on.

When the bypass channel is turned on, output from the first power source 108 undergoes reverse polarity protection by the first PP device 112 such that current output by the power source 108 can only flow through the PP device 112 in a selected direction. If the polarity of the voltage is reversed, the current is blocked and cannot flow through the PP device 112. However, when the polarity of the voltage is proper, current output by power source 108 can flow through the PP device 112.

The bypass channel can be formed in the N-Channel MOSFET PP devices 114 and/or 118 by positively biasing a gate with respect to its source of the PP device 114, 118, which causes a drain-source channel of the PP device 114, 118 to be turned on.

FIG. 3 shows a schematic illustration of the power supply circuit 100 having parallel first and second power sources 108, 110 of first and second protection modules 102, 104. First and second PP devices 112, 114 are operatively coupled to the first power source 108 for providing reverse polarity protection. The third and fourth PP devices 116, 118 are operatively coupled to the second power source 110 for providing reverse polarity protection. The first, second, third, and fourth PP devices 112, 114, 116, 118 are shown as transistors. In an embodiment, the first, second, third, and fourth PP devices 112, 114, 116, 118 are MOSFETs. In an embodiment, the power supply circuit 100 could be reconfigured to use relay devices, such as electromechanical or solid-state relay devices, instead of one or more of PP devices 112, 114, 116, 118.

Output from the positive terminal 124 of the first power source 108 flows through the first PP device 112 to the positive supply bus 122. Output from the negative terminal 126 of the first power source 108 flows through the second PP device 114 to the negative supply bus 120. Similarly, output from the positive terminal 128 of the second power source 110 flows through the third PP device 116 to the positive supply bus 122. Output from the negative terminal 130 of the second power source 110 flows through the fourth PP device 118 to the negative supply bus 120.

The structure and function of protection module 102, including the first and second PP devices 112, 114, the first power source 108, and the control transistor 302, are described above with respect to FIG. 2.

With respect to protection module 104, the third PP device 116 also includes a bypass channel. When the bypass channel is turned on, output from the second power source 110 undergoes reverse polarity protection by the third PP device 116 such that current output by the second power source 110 can only flow through the third PP device 116 in a selected direction. If the polarity of the voltage is reversed, the current is blocked and cannot flow through the third PP device 116. However, when the polarity of the voltage is proper, current output by second power source 110 can flow through the third PP device 116. The respective control transistors 302, 304 control the bypass channel of the first and third PP devices 112 and 116 to turn the bypass channels on or off.

The power supply circuit 100 as shown in FIG. 3 further includes a control transistor 304 that controls the bypass channel of the third PP device 116 to turn the bypass channel on or off. When the bypass channel is turned on, output from the second power source 110 undergoes reverse polarity protection by the third PP device 116 such that current output by the power source 110 can only flow through the third PP device 116 in a selected direction. If the polarity of the voltage is reversed, the current is blocked and cannot flow through the third PP device 116. However, when the polarity of the voltage is proper, current output by the second power source 110 can flow through the third PP device 116. In an embodiment, the control transistors 302 and 304 are P-channel MOSFETs. In an embodiment, the power supply circuit 100 could be reconfigured to use relay devices, such as electromechanical or solid-state relay devices, instead of one or more of the control transistors 302, 304.

The power supply circuit 100, as shown in FIG. 3, further includes a controller 306 that receives monitoring signals 132 and 134 and transmits control signals via control lines 136, 138 to the control transistors 302 and 304 to control the bypass channels of the first PP device 112 and the second PP device 116. The controller 306 can be, for example, a processing device, a microcontroller, a field programmable gate array, an application specific integrated circuit, logic circuitry, or the like. In addition, the functions performed by the controller 306 can be performed using software, hardware, firmware, or a combination thereof. The power supply circuit 100 can further include a Schottky diode 308 coupled in parallel to the first and/or third PP devices 112, 116 to provide reverse polarity protection. An output signal 310 is provided to a load. In embodiments, the power supply circuit 100 can include resistors 312 to provide circuit functionality as needed.

In an embodiment, monitoring signal 132 can monitor a signal line that is coupled between the positive terminal 124 of the first power source 108 and the first PP device 112, and monitoring signal 134 can monitor a signal line that is coupled between the positive terminal 128 of the second power source 110 and the third PP device 116 of the second protection module 104.

In an embodiment, the control signal transmitted via control lines 136 is transmitted to the first control transistor 302 and the control signal transmitted via control lines 138 is transmitted to the second control transistor 304. The controller 306 can control the first and second control transistors 302 and 304 independently of one another in response to the control signals transmitted via control lines 136 and 138.

In an embodiment, the controller 306 turns off the first and second bypass channels in response to detection of a condition. An example of a first condition is an indication that the power supply circuit 100 is initially turned on, such as based on detection of installation of either of the first and second power sources 108, 110 with proper polarity orientation. An example of a second condition is an indication that voltage of one of the negative of positive supply buses 120, 122 has dropped, such as to a level at which the bypass control circuit 106 is unable to properly manage the bypass channels. When the bypass channel of the first PP devices 112, 116 is turned off, the outputs from the respective first and second power sources 108, 110 are subjected to diode blocking. When the condition is not detected, the bypass channel is turned on so that the outputs from the first and second power sources 108, 110 are not subjected to diode blocking voltage drop. Accordingly, by selectively bypassing diode blocking, voltage drops can be reduced, which can improve the resultant supply voltage and the battery service life.

For example, the monitor signals 132 and 134 can indicate an occurrence of the first condition. The monitor signal 132 monitors the terminal voltage of the first power source 108 and can indicate when the first power source 108 is installed with proper polarity orientation. Similarly, the monitor signal 134 monitors the terminal voltage of the second power source 110 and can indicate when the second power source 110 is installed with proper polarity orientation. In response to an indication of an occurrence of the first condition with respect to the first and/or second power source 108, 110, the controller 306 can turn off the bypass channel of first and/or second PP device 112, 116 for a predetermined time interval that defines the power up phase of either of the first and second power sources 108, 110.

The monitor signals can also indicate an occurrence of the second condition. The controller 306 can determine whether a differential voltage associated with the terminal voltages of the first and second power sources 108, 110 is above a predetermined threshold. The differential voltage refers to a difference between the voltages, e.g., the difference between the terminal voltages of the first and second power sources 108, 110. In response to an indication of an occurrence of the second condition associated with the first and/or second power source 108, 110, the controller 306 can turn off the bypass channel of the first and/or second PP device 112, 116, e.g., to block adverse interaction between power sources, such as charge/discharge currents between batteries.

When the Schottky diodes 308 are not included in the power supply circuit 100, bodies of the first and third PP devices 112, 116 can be used as blocking diodes. When the Schottky diodes 308 are connected in parallel with body diodes of enhancement-mode P-Channel MOSFETs, such as PP devices 112 and 116, the Schottky diodes 308 provide a path with a lower forward voltage drop. For example, body diodes typically drop 0.7V, whereas a Schottky diode typically drops 0.3V.

In operation, the controller 306 determines, based on monitoring signals 132, 134, when the first condition has occurred in association with installation, with proper orientation, of either of the first and second power sources 108, 110. In response, the controller 306 turns off the bypass channel associated with the newly installed power source for the predetermined time period, after which the bypass channel is turned on. After the other power source is installed with proper orientation, the controller 306, again turns off the bypass channel associated with the newly installed power source for the predetermined time period, after which the bypass channel is turned on. The controller 306 monitors monitoring signals 132, 134. In response to a determination that the differential voltage associated with the terminal voltages of the first and second power sources 108, 110 exceeds a threshold, the bypass channel is turned off for the power source that has a voltage that is trending in a downward direction with respect to the other power source. The bypass channel can be turned on again if the differential voltage shrinks to a value that is below the threshold.

The methods and systems of the present disclosure, as described above and shown in the drawings, provide for a circuit with superior properties including detecting reverse polarity and measuring voltage. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A power supply circuit, comprising:
   first and second power sources coupled in parallel;
   a first circuit path that provides reverse current blocking and reverse polarity protection associated with positive terminals of the respective first and second power sources, the first circuit path including a first transistor to provide reverse polarity protection for output from the positive terminal of the first power source by a first body diode of the first transistor, and a second transistor to provide reverse polarity protection for output from the positive terminal of the second power source by a second body diode of the second transistor;
   a second circuit path that bypasses current blocking of the first circuit path, the second circuit path including a first bypass channel of the first transistor, and a second bypass channel of the second transistor;
   a third circuit path that provides reverse polarity protection associated with negative terminals of the respective first and second power sources, the third circuit path including a third transistor to provide reverse polarity protection by a third body diode of the third transistor for output from the negative terminal of the first power source, and a fourth transistor to provide reverse polarity protection by a fourth body diode of the fourth transistor for output from the negative terminal of the second power source; and
   a bypass control circuit that controls the second circuit path based on determination of a predetermined condition.

2. The power supply circuit of claim 1, wherein the bypass control circuit includes:
   a first control transistor that controls the first bypass channel, wherein when the first bypass channel is turned on, output from the first power source flows through the first bypass channel instead of through a first body diode, and when the first bypass channel is turned off, output from the first power source undergoes reverse current blocking and reverse polarity protection by the first body diode; and
   a second control transistor that controls the second bypass channel, wherein when the second bypass channel is turned on, output from the second power source flows through the second bypass channel instead of through the second body diode, and when the second bypass channel is turned off, output from the second power source undergoes reverse current blocking and reverse polarity protection by the second body diode.

3. The power supply circuit of claim 2, wherein the bypass control circuit further includes a controller that transmits control signals to the first and second control transistors to control the first and second bypass channels independently of one another.

4. The power supply circuit of claim 3, wherein the controller controls turning off at least one of the first and second bypass channels for a predetermined time interval, the predetermined time interval defining a power up phase of either of the first and second power sources.

5. The power supply circuit of claim 3, wherein the controller controls turning off at least one of the first and second bypass channels in response to detection of installation with proper polarity orientation of one of the first and second power sources, so that the output from at least one of the first and second power sources flows through the first circuit path, but not through the second circuit path.

6. The power supply circuit of claim 5, wherein the controller monitors terminal voltages of the first and second power sources in response to detection of installation with proper polarity orientation of at least one of the first and second power sources.

7. The power supply circuit of claim 5, wherein the controller controls turning on at least one of the first and second bypass channels in response to a determination that a differential voltage between the terminal voltages of the first and second power sources is below a predetermined threshold, so that the output from at least one of the first and second power sources flows through the second circuit path, but not through the first circuit path.

8. The power supply circuit of claim 5, wherein the controller controls turning off at least one of one of the first and second bypass channels upon a determination that the differential voltage is above the predetermined threshold.

9. The power supply circuit of claim 1, further comprising a Schottky diode connected in parallel to the first transistor to provide reverse current blocking and reverse polarity protection.

10. The power supply circuit of claim 1, wherein the first and second transistors are enhancement-mode P-channel MOSFETs, and the third and fourth transistors are enhancement-mode N-channel MOSFETs.

11. A power supply circuit, comprising:
    a power source;
    a first circuit path that provides reverse current blocking and reverse polarity protection associated with a positive terminal of the power source, the first circuit path including a first transistor to provide reverse polarity protection for output from the positive terminal of the power source by a first body diode of the first transistor;
    a second circuit path that bypasses current blocking of the first circuit path, the second circuit path including a bypass channel of the first transistor;
    a third circuit path that provides reverse polarity protection associated with a negative terminals of the power source, the third path including a second transistor to provide reverse polarity protection by a second body diode of the second transistor for output from the negative terminal of the power source; and
    a bypass control circuit that controls the first and second circuit paths based on determination of a predetermined condition.

12. The power supply circuit of claim 11, wherein the bypass control circuit includes a control transistor that controls the bypass channel of the first transistor, so that when the bypass channel is turned on, output from the power source flows through the bypass channel instead of through the first body diode; and when the bypass channel is turned off, output from the power source undergoes reverse current blocking and reverse polarity protection by the first body diode.

13. The power supply circuit of claim 11, further comprising a controller that controls turning off at least one of the first and second bypass channels for a predetermined time interval, the predetermined time interval defining a power up phase of either of the first and second power sources.

14. A method of protecting a power supply circuit comprising:
    controlling a first and second circuit path, comprising:
        providing reverse current blocking and reverse polarity protection associated with positive terminals of respective first and second power sources;
        bypassing current blocking of the first circuit path in a second circuit path;

providing reverse polarity protection associated with negative terminals of the respective first and second power sources;

controlling the second circuit path based on determination of a predetermined condition;

controlling a first bypass channel of a first transistor, wherein when the first bypass channel is turned on, output from the first power source flows through the first bypass channel instead of through a first body diode of the first transistor, and when the first bypass channel is turned off, output from the first power source undergoes reverse current blocking and reverse polarity protection by the first body diode; and controlling a second bypass channel of a second transistor, wherein when the second bypass channel is turned on, output from the second power source flows through the second bypass channel instead of through a second body diode of the second transistor, and when the second bypass channel is turned off, output from the second power source undergoes reverse current blocking and reverse polarity protection by the second body diode.

15. The method of claim 14, wherein the first and second bypass channels are controlled independently of one another.

16. The method of claim 15 further comprising controlling turning off at least one of the first and second bypass channels in response to detection of installation with proper polarity orientation of one of the first and second power sources, so that the output from at least one of the first and second power sources flows through the first circuit path, but not through the second circuit path.

17. The method of claim 16 further comprising monitoring terminal voltages of the first and second power sources in response to detection of installation with proper polarity orientation of at least one of the first and second power sources.

18. The method of claim 17 further comprising controlling turning on at least one of the first and second bypass channels in response to a determination that a differential voltage between the terminal voltages of the first and second power sources is below a predetermined threshold, so that the output from at least one of the first and second power sources flows through the second circuit path, but not through the first circuit path.

19. The method of claim 18 further comprising controlling turning off at least one of one of the first and second bypass channels upon a determination that the differential voltage is above the predetermined threshold.

20. The method of claim 14, further comprising controlling turning off at least one of the first and second bypass channels for a predetermined time interval, the predetermined time interval defining a power up phase of either of the first and second power sources.

* * * * *